Dec. 29, 1964

B. GROLMAN 3,163,358

REFRACTIONIST'S OPTICAL CENTER LOCATION DEVICE

Filed March 1, 1963

INVENTOR
BERNARD GROLMAN

BY J. Albert Kultquist

ATTORNEY

Dec. 29, 1964   B. GROLMAN   3,163,358
REFRACTIONIST'S OPTICAL CENTER LOCATION DEVICE

Filed March 1, 1963   3 Sheets-Sheet 2

INVENTOR
BERNARD GROLMAN
BY
ATTORNEY

INVENTOR
BERNARD GROLMAN
ATTORNEY

United States Patent Office 3,163,358
Patented Dec. 29, 1964

3,163,358
REFRACTIONIST'S OPTICAL CENTER
LOCATION DEVICE
Bernard Grolman, Worcester, Mass., assignor to American Optical Company, Southbridge, Mass., a corporation of Massachusetts
Filed Mar. 1, 1963, Ser. No. 262,139
2 Claims. (Cl. 235—89)

This invention relates to an optical center location device for refractionists and has particular reference to novel means for facilitating determination of the optimum location for the optical center of an ophthalmic lens in the eyewire portion of a mounting in which the lens is to be supported for use.

In the fitting of ophthalmic lenses before the eyes, such factors as distance of the mounting from the eyes and inclination or pantoscopic tilt of the mounting have, heretofore, been taken for granted and not usually considered in the prescriptive requirements for location of the optical centers of the lenses. Consequently, the design criteria employed in ophthalmic lens design has not been fully exploited.

For optimum performance as part of a lens-eye system, it is necessary for a lens to have its optical center so located in a mounting that the optical axis of the lens passes through the effective stop point of the eye. This point is referred to as the "sighting center" and is the intersection of the visual axis of the eye, in any sighting orientation, with the visual axis of the same eye in its primary position (looking straight ahead).

In order to locate the optical center of a lens in a mounting so that the lens' optical axis will intersect the sighting center of the eye, the degree of inclination or pantoscopic tilt of the mounting and the distance from the sighting center of the eye to the mounting must be considered.

Since this would ordinarily involve relatively long and tedious computations, it is an object of the present invention to obviate such computations and provide for simple and expedient determination of optimum position for the optical center of an ophthalmic lens in a mounting.

Another object is to provide novel and improved means for accurately determining the particular location of the optical center of a lens in a mounting necessary to position the optical axis of the lens in intersecting relation with the sighting center of the eye; to provide a device for determining the location of such optical center from known factors of degree of pantoscopic tilt of the mounting, distance from the mounting to the eye and sighting center distance of the eye; and to provide such a device which is of compact size, inexpensive construction and simple to operate.

A further object is to provide a device of the above character by which determinations of optimum location for the optical center of a lens in a mounting can be made with speed and without likelihood of error.

To attain the aforesaid objects, and others which may appear from the following detailed description, in accordance with one aspect of the present invention, I provide a chart having scales in prearranged positions thereon. Indicia along the lengths of the scales represent values respectively of distance from the sighting center of the eye to the corneal vertex thereof, distance from said corneal vertex to the plane of the eyewire of a mounting which is to support the lens before the eye and location of the optical center which is to be determined. Mounted for sliding movement on the chart is a slide having lines thereon representing different values of pantoscopic tilt of the mounting. Pantoscopic tilt is determined from the construction of the mounting and is a measure of the angle of inclination of the mounting's lens supporting section relative to a line normal to the primary visual axis of the patient. Lying on the slide and movable thereover in a plane parallel to the slide an indicating member is positioned for adjustment parallel to respective planes of the slide and chart. The indicating member is provided with a pair of right angularly related intersecting lines and the intersection of said lines is used as a reference point to read off values of said scale representing location of the optical center to be determined.

The device is operated by adjusting the slide relative to the chart so as to position said lines representing pantoscopic tilt of the mounting in known indicating relation to the scale representing values of distance from the corneal vertex of the eye to the plane of the eyewire of the mounting. This setting is made in accordance with a measurement taken from the patient with the mounting in position of use. The indicating member is next adjusted on the slide so as to position one of its lines in coincidence with a selected line representing degree of pantoscopic tilt of the mounting.

While maintaining coincidence of said one line on said indicating member with the selected pantoscopic tilt line on said slide, the indicating member is adjusted to cause its other line to intersect or point to a selected value of distance from the corneal vertex to the sighting center of the eye on the scale provided therefor. At this time, the point of intersection of the lines on the indicating member is used as a reference to read off a value on the scale representing location of the optical center of the lens. This reading gives a measure of the distance from the primary visual axis of the eye to the optimum location for the optical center of the lens in its vertical meridian.

The present invention will be more fully understood by reference to the following detailed description which is accompanied by drawings in which.

Ophthalmic mountings are designed to be inclined inwardly when fitted for use before the eyes so as to tilt lenses supported therein to a position approximately normal to the inferior sighting direction of the eyes used for reading. In so doing, the optical axes of the lenses become inclined relative to the primary visual axes of the eyes.

In conventional fitting practices where a lens' optical center is located on or near the primary visual axis of an eye, the lens' optical axis, more often than not, does not pass through the sighting center of the eye and the eye does not enjoy all of the advantages of the lens.

Figure 1:
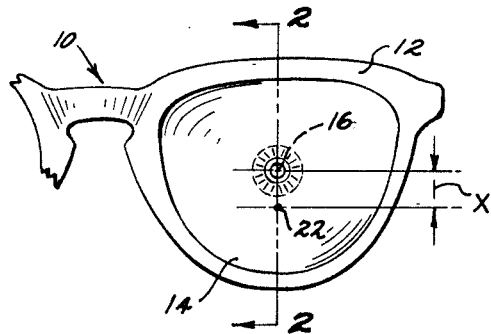
FIG. 1 is a fragmentary plan view of an ophthalmic mounting illustrating the principles of the invention.
Figure 2:
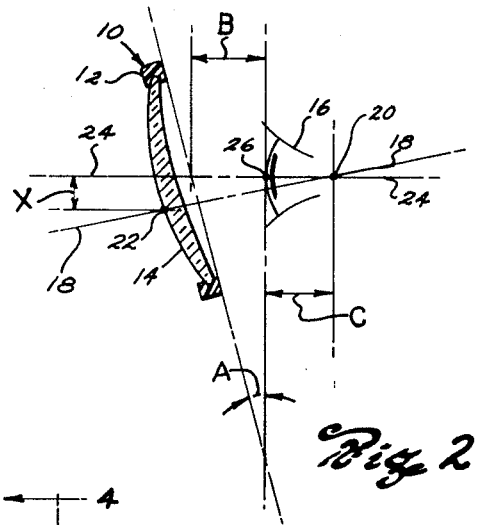
FIG. 2 is a cross-sectional view taken on line 2—2 of FIG. 1.

In FIGS. 1 and 2 there is shown a portion of an ophthalmic mounting 10 having eyewire section 12 in which lens 14 is supported in proper position before eye 16 in accordance with the principles of this invention.

As best shown in FIG. 2, optical axis 18 of lens 14 passes through sighting center 20 of eye 16 thereby locating optical center 22 of lens 14 a distance $x$ (in the vertical meridian) below primary visual axis 24 of eye 16. Angle A represents pantoscopic tilt of mounting 10, B represents distance from corneal vertex 26 of eye 16 to mounting 10 and C represents distance from corneal vertex 26 to sighting center 20 of eye 16.

As it is evident from the geometry of FIG. 2, distance $x$ is a variable which is dependent upon values of angle A and distances B and C. Angle A is determined by direct measurement of mounting 10 with a suitable protractor or the like when the mounting is fitted upon the patient. Distance B is measured with a scale or the like also with the mounting fitted upon the patient. Distance C is determined from the patient's axial ametropia as determined during examination of the eye. Distance C from the corneal vertex of a normal or emmetropic eye to its sighting center is known to be approximately 14.5 millimeters for distance viewing and approximately 13.1 millimeters for near viewing. For moderate to high axial ametropia the above sighting center distances would be modified for distance viewing by an increase of .14 millimeter for each 1 diopter increase of myopia and for near viewing by an increase of .18 millimeter for each 1 diopter increase of myopia. For small axial ametropia, the normal values of 14.5 millimeters and 13.1 millimeters would be used. Accordingly, distance C is determined from the refractive findings during examination of the patient's eyes.

In accordance with this invention, measuring device 28 (see FIGS. 3-7) provides simple and expedient means for determining from values of independent variables A, B and C, the dependent variable $x$.

Figure 4:
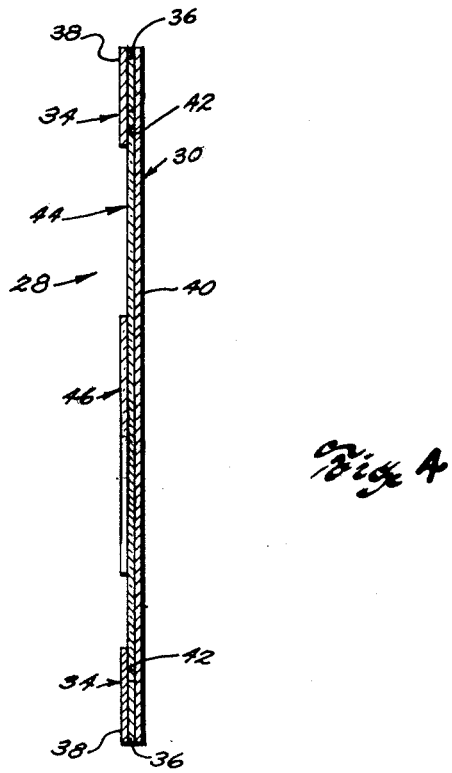
FIG. 4 is a cross-sectional view taken on line 4—4 of FIG. 2.
Figure 7:
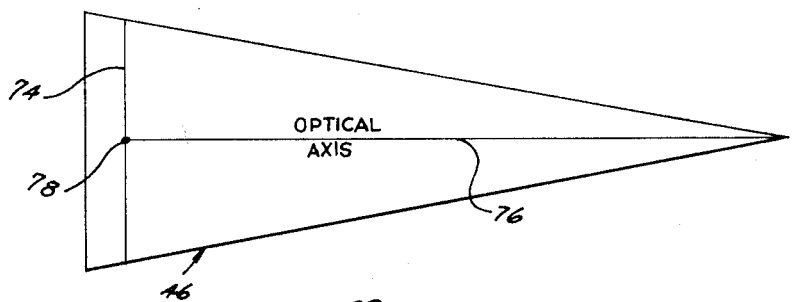
FIGS. 5, 6 and 7 are plan views respectively of component parts of the embodiment.

Device 28 comprises main supporting structure 30 which may be formed of suitable relatively rigid sheet material such as cardboard, plastic or metal. Extending along upper and lower edges of structure 30 are guide members 34. Guide members 34 may be formed as best illustrated in FIG. 4 by cementing, stapling or otherwise securing strips 36 and 38 of sheet material to backing sheet 40 of structure 30. Strips 36, being narrower than strips 38, provide guideways 42.

In guideways 42, slide 44 is fitted for sliding movement along structure 30. Indicating member 46 is designed to be adjustably held in place upon slide 44. Structure 30 is provided with chart 48 between guide members 34 (see FIG. 5) which may be printed or otherwise applied directly to backing sheet 40 or formed upon a separate sheet cemented, stabled or otherwise affixed to backing sheet 40.

Figure 5:
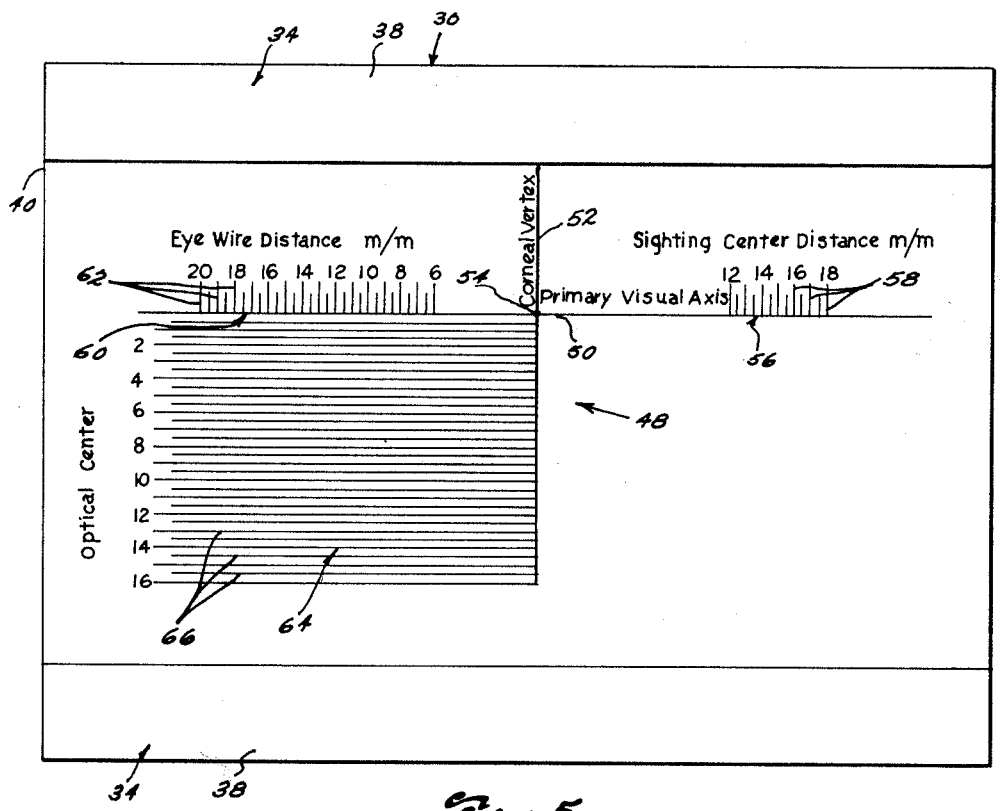

As best illustrated in FIG. 5, it can be seen that chart 48 includes line 50 extending parallel to guideways 42 and right angularly related line 52 intersecting line 50 at point 54. Line 50 represents the primary visual axis of an eye looking through the eyewire of a mounting and point 54 represents the position of the corneal vertex of the eye on said primary visual axis. Scale 56 is provided along line 50 at one side of point 54 having regularly spaced indicia 58 of conveniently readable size and spacing indicating distances from point 54. Indicia of scale 56 are preferably calibrated to read millimeter distances from point 54 and are representative of distance from the corneal vertex of an eye to its sighting center. At the opposite side of point 54, scale 60, similar to scale 56, is provided with indicia 62 preferably calibrated to read millimeter distances from point 54. Scale 60 represents distance from the corneal vertex of an eye to the eyewire of a mounting to be fitted before the eye.

Along line 52 and extending downwardly from line 50, a third scale 64 is provided with long parallel indicia 66 representing distance from the primary visual axis of an eye to the optimum location of the optical center of a lens to be fitted before the eye. Being consistent with scales 56 and 60, indicia 66 of scale 64 are also preferably calibrated to read millimeter distances. The optical center indicia are long enough to extend over the entire range of usable eyewire distances of scale 62.

Figure 6:
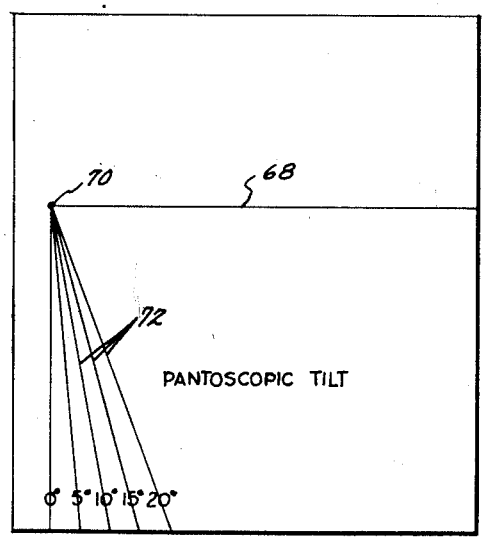

Slide 44 which is preferably formed of a rigid transparent plastic sheet material or the like is provided with a horizontal line 68 (see FIG. 6). When slide 44 is positioned in guideways 42, line 68 becomes coincident with line 50 of chart 48. Depending from point 70 on line 68 are lines 72 representing various degrees of pantoscopic tilt normally encountered in the fitting of mountings before the eyes. Lines 72 are calibrated in convenient multiples of degrees, say at 5° intervals.

Indicating member 46 is preferably formed of a rigid transparent sheet material similar to slide 44 and is provided with right angularly related intersecting lines 74 and 76. Line 76 represents the optical axis of a lens to be fitted before the eye and line 74 is used to align indicating member 46 with a selected line 72 on slide 44.

As it will become apparent from a detailed description of the operation of device 28 to follow, the point of intersection 78 of lines 74 and 76 is used to read off values on scale 64 giving a determination of the optimum position for the optical center of a lens below the primary visual axis of the eye.

Figure 3:
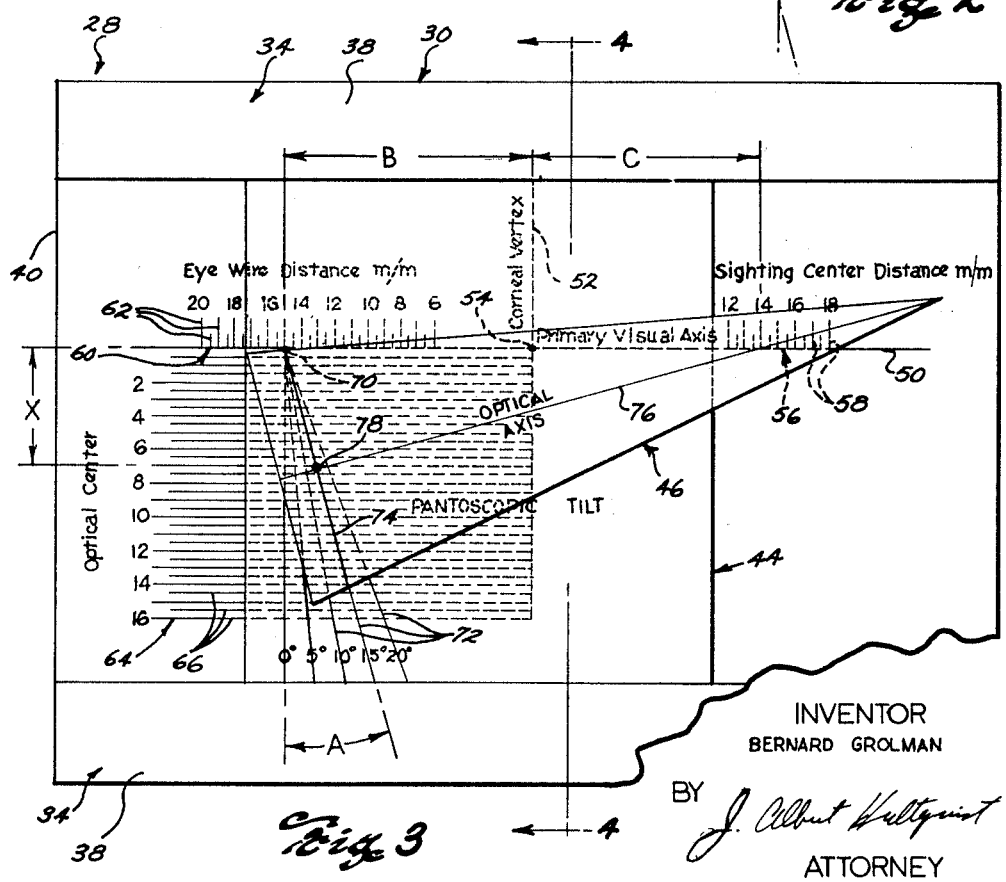
FIG. 3 is a plan view of an embodiment of the invention.

Referring more particularly to FIGS. 2 and 3, it can be seen that lines 72 on slide 44 represent values of angle A (FIG. 2), scale 60 on chart 48 represents values of distance B (FIG. 2), scale 56 on chart 48 represents values of distance C (FIG. 2) and scale 64 represents values of distance X to be determined with device 28.

For known values of angle A and distances B and C which are determined from the patient's fitting requirements in the manner described hereinabove, distance X is determined with device 28 as follows:

Slide 44 is adjusted on main supporting structure 30 to position point 70 in coincidence with an indicium 62 of scale 60 which represents distance B. Indicating member 46 is positioned on slide 44 with line 74 thereof in coincidence with a selected line 72 which represents angle A. While maintaining the coincident relationship of line 74 with selected line 72, indicating member 46 is adjusted to cause line 76 to pass through or point to an indicium 58 of scale 56 which represents distance C.

With device 28 so adjusted, distance X is read off on scale 64 by reference to point 78 on indicating member 46.

Considering for example that values A, B and C are 15°, 15 millimeters and 14 millimeters respectively, device 28 would be adjusted to the setting illustrated in FIG. 3 wherein it can be seen that distance X, as read from point 78, will be 7 millimeters. Thus, for optimum performance of a lens to be fitted under the above conditions, the optical center of the lens should be located 7 millimeters below the primary visual axis of the respective eye so that optical axis 18 of the lens will pass through the sighting center of the eye in the manner illustrated in FIG. 2.

Since ophthalmic lenses are ordinarily finished to size and shape so as to have their geometrical or mechanical centers coincident with or in known relation to the primary visual axis of respective eyes when fitted for use, determination of distance X provides the ophthalmic practitioner with a measure of the distance below the geometrical or mechanical center of a lens to the optimum location for the optical center of the lens. Thus, in preparing a lens for finishing to size and shape the optical center of the lens is decentered from the established geometrical center of the lens an amount in accordance with distance X as determined by utilization of device 28.

As it is evident from FIG. 3, device 28 provides a graphical representation of the lens-to-eye relationship required for proper fitting of lenses before the eyes. Thus, in addition to its above described function, device 28 has utility as a visual aid for promoting better understanding of requirements for proper lens fitting in lens-eye systems.

I claim:

1. A device for facilitating determination of the optimum location for the optical center of an ophthalmic lens in the eyewire of a mounting in which said lens is to be supported for use before the eye, said device comprising a chart having a number of scales in prearranged positions thereon, said scales having indicia representing values respectively of distance from the sighting center of said eye to the corneal vertex thereof, distance from said corneal vertex to the plane of said eyewire and position of said optical center to be determined, a first member on said chart having lines thereon representative of different values of pantoscopic tilt of said mounting, said first member being adjustable relative to said chart in a plane parallel thereto for selectively positioning said lines in predetermined indicating relation to indicia on the scale which represents values of distance from said corneal vertex to the plane of said eyewire, a second member having right angularly related lines intersecting each other at a point thereon, said second member being adjustable relative to said first member in a plane parallel thereto for positioning one of its lines in coincidence with a selected one of said lines on said first member and with the other of its lines, at the same time, indicating a selected value of the scale which represents distance from the sighting center of said eye to the corneal vertex thereof whereby the point of intersection of said lines on said second member will indicate the optimum location for the optical center of said lens on the scale which represents values of position of said optical center.

2. A device for facilitating determination of the optimum location for the optical center of an ophthalmic lens in the eyewire of a mounting in which said lens is to be supported for use before the eye, said device comprising a main supporting structure having a pair of guide members along respective opposite edges thereof, a chart on said structure between said guide members having scales in prearranged positions thereon, indicia on said scales representing values respectively of distance from the sighting center of said eye to the corneal vertex thereof, distance from said corneal vertex to the plane of said eyewire and position of said optical center to be determined, a transparent slide member slidably mounted in said guide members having lines thereon representative of different values of pantoscopic tilt of said mounting, said slide member being adjustable to selectively position lines thereon in desired indicating relation to said scale representing values of distance from said corneal vertex to the plane of said eyewire, a transparent indicating member having first and second right angularly related intersecting lines thereon positioned on said slide member and said indicating member being adjustable in a plane parallel to said slide member whereby with said indicating member adjusted to position a first of its lines in coincidence with a selected one of said lines on said slide member and with the second of its lines indicating, at the same time, a selected value of said scale representing distance from the sighting center of said eye to the corneal vertex thereof, the point of intersection of said lines on said indicating member will indicate said optimum location for said optical center of said lens on said scale representing values of position of said optical center.

References Cited in the file of this patent
UNITED STATES PATENTS 2,434,306     Wood _____ Jan. 13, 1948
3,026,031     Jones _____ Mar. 20, 1962